United States Patent [19]

Masi

[11] 3,951,513
[45] Apr. 20, 1976

[54] SEMICONDUCTOR LIGHT MODULATING OPTICAL WAVE GUIDE

[76] Inventor: James V. Masi, 3 Sportsman Drive, Huntington, Conn. 06484

[22] Filed: Sept. 9, 1974

[21] Appl. No.: 504,066

[52] U.S. Cl. .................... 350/96 WG; 350/160 R; 350/150
[51] Int. Cl.² .................... G02B 5/14; G02F 1/01
[58] Field of Search ......... 350/96 WG, 96 R, 160 R

[56] References Cited
UNITED STATES PATENTS

| | | | |
|---|---|---|---|
| 3,462,211 | 8/1962 | Nelson et al. | 350/96 WG |
| 3,866,143 | 2/1975 | Jacobs et al. | 350/96 WG |

OTHER PUBLICATIONS

Cheo, Appl. Phys. Lett., Vol. 22, No. 5, Mar. 1973, pp. 241–244.
Pinto et al., Appl. Phys. Lett., Vol. 19, No. 7, Oct. 1971, pp. 221–223.
Reinhard et al., Appl. Phys. Lett., Vol. 23, No. 9, Nov. 1973, pp. 521–523.
Reinhart et al., Appl. Phys. Lett., Vol. 20, No. 1, Jan. 1972, pp. 36–38.

Primary Examiner—John K. Corbin
Assistant Examiner—Jon W. Henry

[57] ABSTRACT

A wave guide device for varying the polarization of a light beam comprises a diode formed of a film of a material such as a glassy amorphous material or a plastic of a first kind of electrical conductivity (P or N) disposed on a substrate of semiconductor material exhibiting the opposite kind of electrical conductivity (N or P), an input optical coupler for coupling a light beam into the glassy film of the diode so that the light will pass through the film by a series of internal reflections, an output optical coupler and means for applying a bias voltage to the diode. In operation, variation of the bias voltage varies the phase of the light beam as it passes therethrough. This change in phase can be detected as a change in the polarization of the light beam exiting from the output coupler.

23 Claims, 5 Drawing Figures

SEMICONDUCTOR LIGHT MODULATING OPTICAL WAVE GUIDE

BACKGROUND OF THE INVENTION

The widespread use of optical devices in the communications industry has created a significant need for high performance electro-optical devices which are compatible with conventional semiconductor devices and fabrication techniques. One particularly acute need is for a phase modulating optical wave guide.

Thin film light guiding devices hold great promise for future use in conjunction with other optical devices and conventional integrated semiconductor devices. Ultimately, the thin films and coupling devices may be deposited on an integrated circuit chip, light emitting diodes, photodetectors, and the like, to produce integrated electro-optical circuits.

While prior art devices have been developed for guiding light beams, these developments do not include a practical thin film phase modulator. Generally, prior art wave guide devices include an input coupler, a thin film path for transmitting the light beam, and a substrate. The light beam typically enters the film through an optical coupler, such as a prism coupler or grating coupler, at an angle of incidence greater than the critical angle, thereby causing the light to travel through the thin film by multiple internal reflections between the outer surface of the thin film and the surface of the thin film adjacent the substrate. After the light has proceeded through the thin film, it is coupled to a utilization device such as a photoelectric cell. Output coupling is accomplished either by direct contact with the thin film or by the use of an optical coupler.

While attempts have been made to develop thin film bulk effect modulators using the Pockels effect or the Kerr effect, little success has yet been achieved in making these devices compatible with integrated circuits. For example, a thin film wave guide using the Kerr effect in Yttrium-gallium-scandium-iron garnet has been developed which can vary the polarization of a laser beam, but the device suffers from several distinct disadvantages which limit its practical employment. For example, it is very difficult to fabricate a garnet wafer on the same chip with conventional semiconductor devices. In addition, the amount of voltage required to change the light phase is too high (in the order of $10^3-10^5$ volts per cm.) to make the device compatible with conventional semiconductor circuitry. Moreover, the speed with which the beam can be modulated is also quite low. Generally, modulation signals cannot exceed 80 MHz. Other known bulk effect light modulators, such as Pockles effect devices, suffer substantially the same deficiencies.

A gallium phosphide wave guide device operating on the electro-optic effect has been recently developed. This device, while enjoying a number of advantages over previous bulk effect devices, nonetheless suffers from practical disadvantages which limit its use in integrated circuits. For examples, the gallium phosphide requires that the light beam be directed into the wave guide at a precise angle. Improper orientation results in unacceptable losses. Moreover, losses are very high even when the light is properly directed. In addition, the device requires a relatively high voltage (in the order of 15 volts) for activation. Although this voltage is significantly below the voltage required by bulk effect devices, it is not easily interfaced with other integrated circuit components which usually operate with a supply of about 5 volts.

SUMMARY OF THE INVENTION

In accordance with the present invention, a wave guide device for varying the polarization of a light beam comprises a diode formed of a layer of a glassy amorphous material of a first kind of electrical conductivity (P or N) disposed on a substrate of semiconductor material exhibiting the opposite kind of electrical conductivity (N or P). An input optical coupler couples a light beam into the glassy layer of the diode, allowing the light to pass through the layer by a series of internal reflections and exit through an output optical coupler. Means for applying a reverse bias voltage to the diode are also provided. In operation, variation of the reverse bias voltage varies the index of refraction of the glassy layer and thus varies the phase of the light beam as it passes therethrough. This change in phase can be detected as a change in the polarization of the light beam exiting from the output coupler.

DETAILED DESCRIPTION OF THE PREFERRED EMBODIMENT

Figure 1:
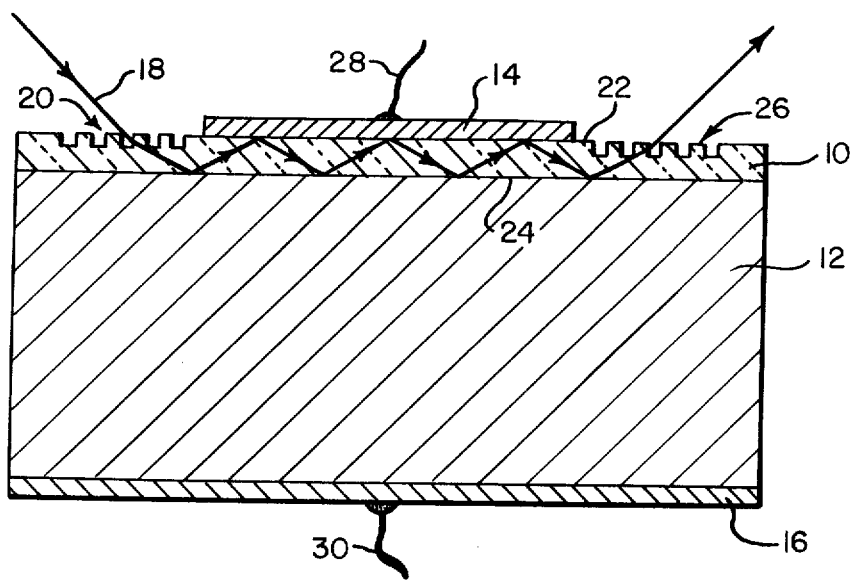
FIG. 1 is a cross-sectional view of a light modulating wave guide device constructed in accordance with the present invention.

Referring to the drawings, FIG. 1 is a cross-sectional view of the inventive light modulating wave guide. The wave guide comprises a film 10 which, in the preferred embodiment, is relatively thin and disposed on a semiconductor substrate 12. Film 10 is a glassy amorphous material exhibiting one kind of electrical conductivity (P or N) and semiconductor substrate 12 is a semiconductor material having the opposite electrical conductivity (N or P respectively). The glassy film 10 and the semiconductor substrate 12 thus together form a PN junction diode. A first electrode 14 is disposed in contact with the glassy film and a second electrode 16 contacts the substrate. Electrodes 14 and 16 are made of conductive material such as a metal and may be deposited in a conventional manner. They may also be made of a translucent conductor material, such as tin oxide. A light beam 18 is coupled by a grating coupler 20 into semiconductor glass film 10, where it proceeds by multiple internal reflections between upper surface 22 and lower surface 24 through the glass film until it is allowed to exit through a second grating coupler 26.

Grating couplers 20 and 26 may take any one of several forms. For example, as illustrated, the grating coupler may take the form of a series of rectangular grooves which are cut into the surface of glassy film 10. Of course, they need not be rectangular but may be triangular or any one of a number of other shapes. The grooves could be cut into glassy film 10 using several different methods. For example, diamond ruling may be employed. Alternatively, the use of a photo-resist technique would also work well. In the second technique, the grooves would be defined through the use of a photo-resist chemical. The film would then be etched and the photo-resist chemical then removed. It is noted that alternatively a series of light and dark areas could simply be deposited on the surface of thin glassy film 10. This could be done either through the evaporation of a metal mask onto the thin film or the lithographic printing of light and dark areas. In all of these phase gratings the density of line pairs would be in the order of about 200 line pairs/mm. By a line pair is meant contiguous light and dark areas or contiguous etched and unetched areas.

As an alternative to phase gratings one could also employ prism couplers or fiberoptic coupling devices. Of course, if one is not concerned with selectively controlling the light which is allowed to enter the device, and one was further not concerned with the efficiency with which light is conducted through the device, one could utilize techniques such as a simple translucent surface in place of a wave coupling device of the type described above.

When the diode is reverse biased by the application of a voltage to electrodes 14 and 16 via lead wires 28 and 30 which are connected to their respective electrodes, the glassy film changes from an optically isotropic medium to an optically anisotropic medium having different optical properties in different directions. This anisotropy causes the two polarization components of the light beam to travel at different velocities through the glassy film 10, thereby phase-modulating the light beam. The magnitude of this phase modulation is a function of the magnitude of the reverse bias voltage applied and the distance which the light beam travels through the glass film. Thus, the polarization of light leaving output grating coupler 26 is different from the polarization of light entering input coupler 20.

Substrate 12 may be made of any conventional semiconductor which has been doped with a conductivity opposite that of the glassy film 10. For example, substrate 12 may be made of such materials as crystalline silicon, gallium arsenide, gemanium, or indium arsenide. Preferably the substrate is doped, by conventional techniques, to a concentration of impurities in excess of about $10^{14}$–$10^{17}$ atoms per cubic centimeter. Preferably, the substrate has an index of refraction substantially different from that of the glassy layer in order to maximize the amount of light transmitted by achieving substantially total internal reflection. The thickness of the substrate is not critical. It need only be thick enough to provide support for the thin film and is typically in the order of about 125 microns thick.

Glassy film 10 is preferably in the order of 0.5 to 10 microns thick and can be made of any glassy amorphous material which exhibits electrical conductivity in the semiconducting range. The term glassy amorphous material, as used herein, defines those materials which typically exhibit only short-term ordering. The term is intended to include not only glasses, but also those "amorphous" materials which have any appreciable short-range ordering. However, it is intended to exclude both crystalline substances (such as silicon and silicon dioxide) and true amorphous materials having no appreciable ordering. Glasses, which comprise a specific class of glassy amorphous materials, are typically quenched liquids having viscosity in excess of about $10^8$ poise at ambient temperature. They are generally characterized by: (1) the existence of a single phase; (2) gradual softening and subsequent melting with increasing temperature rather than sharp melting characteristics; (3) conchoidal fracture; and (4) the absence of crystalline X-ray diffraction peaks.

The glassy amorphous material should either be a semiconducting material, such as a chalcogenide-halogenide glass, having a low resistivity below about $10^5$ Ωcm. or should be doped to exhibit such a low resistivity. However, with resistivities below about 1 Ωcm., the layer begins to act as a conductor, and the device loses its junction characteristics.

Glasses normally considered insulating glasses can be doped to exhibit low resistivities by driving ions of conductive materials, such as metals, therein. For example, the glassy layers can be doped by applying a thin layer of metal thereupon and heating the resulting structure to a temperature near the softening temperature of the glass. This technique and similar techniques are described in detail in copending application Ser. No. 227,932, filed Feb. 22, 1972, now abandoned, assigned to applicant's assignee. Alternatively, the glass layer may be given the needed conductivity by applying it in a sufficiently thin layer below about five microns as is described in detail in copending application Ser. No. 227,933, filed Feb. 22, 1975, now U.S. Pat. No. 3,801,809, assigned to applicant's assignee.

In making the device, one may select from quite a wide variety of materials. These materials include a wide variety of glasses and, in principle, plastics. Many glasses naturally exhibit either positive or negative type conductivity. In practice, it is most convenient to select a glass with a positive or negative type conductivity for use as a positive or negative layer in a device. Of course, compensation doping can often be performed on a glass of a given conductivity type in order to change its conductivity to the other type or to change the level of conductivity without changing conductivity type. The following table lists a number of glasses and their naturally exhibited conductivity type.

| Glass | Conductivity Type |
|---|---|
| Calcium Aluminum Borate glasses | P |
| CdO | N |
| $In_2O_3$ | N |
| Lead Borosilicate glasses | P |
| NiO | N |
| $Pb_2O_3$ | N |
| Phosphate glasses | N |
| $SnO_2$ | N |
| $TiO_2$ | N |
| Vanadate glasses | N |
| Vanadium Phosphate glasses | N |
| Zinc Alumino-Silicate glasses | P |

By way of example, in a typical device electrode 14 would be in the order of 1 micron thick. It would be made of aluminum and include an interfacing surface between the electrode 14 and glassy film 10 which would be made of chromium. The layer of chromium between the aluminum and the thin glassy surface would be in the order of 500 angstroms thick. Electrode 16 could be made of a standard gold and antimony alloy and might typically constitute 95% gold and 5% antimony. Substrate 12 could be made of any material such as, for example, silicon which has been doped with phosphorous in order to give it an N-type conductivity in the order of about 10 Ωcm. Glassy layer 10 could be made of any of a number of P-type glasses such as Zinc Alumino-Silicate glass which has been doped with Boron to give it a P-type conductivity of 100 Ωcm.

Glassy film 10 may be made of any of a number of techniques such as layering the glass by chemical vapor deposition, sedimentation, sputtering, etc. If it is desired to dope the glass, doping may be done, for example, by melt doping before deposition, thermal diffusion after deposition, electro-thermal diffusion after deposition, ion implantation after deposition or co-deposition of dopant and glass during deposition.

Figure 2:
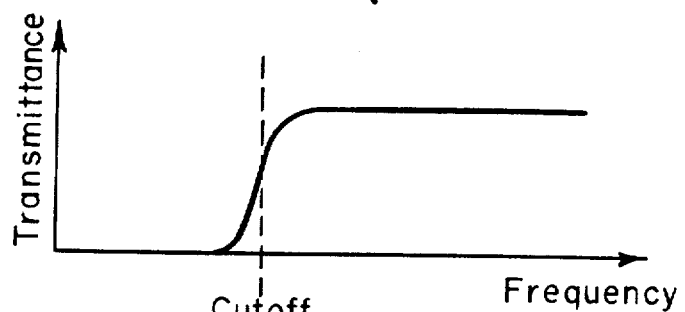
FIG. 2 is a graph showing the transmittance of a typical device as a function of frequency.

The frequency response of a typical device is shown in FIG. 2. As can be seen from FIG. 2, the response of the wave guide extends to a wavelength of 3,200 A in the ultraviolet range. For light waves having a wavelength in the vicinity of the cutoff wavelength, the wave guide acts as an amplitude modulator due to the fact that changes in phase near the cutoff frequency have the effect of changing the cutoff frequency and thus the amplitude of the output light beam. Of course, the cutoff wavelength can be varied by using different glasses.

Figure 3:
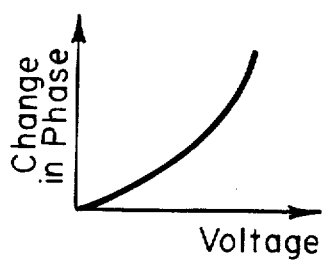
FIG. 3 is a graph showing the variation in phase as a function of the voltage applied to the device for frequencies above the cutoff frequency.
Figure 4:
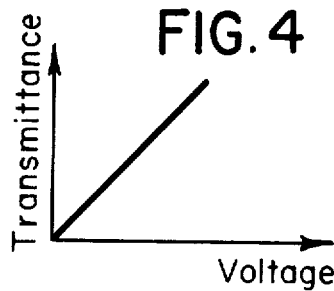
FIG. 4 is a graph showing the transmittance of the device as a function of voltage for frequencies close to the cutoff frequency.

The voltage response of the device is illustrated in FIGS. 3 and 4. As illustrated in FIG. 3, it is seen that for frequencies substantially above the cutoff frequency, the relationship between the phase change is nonlinear with respect to reverse bias voltage. Specifically, the phase change is proportional to the voltage squared. The change in polarization can be made larger by lengthening the path that the light beam travels through the thin film or increasing the doping. For frequencies substantially above the cutoff frequency, there is substantially no variation in the amplitude of the transmitted light beam accompanying the change in phase. However, if it is desired to achieve amplitude variation of the light beam, a light beam having a frequency near the cutoff frequency is transmitted through the thin film. Application of a reverse bias voltage to the diode varies the transmittance of the wave guide as illustrated in FIG. 4 and thereby modulates the amplitude of the transmitted light beam.

Figure 5:
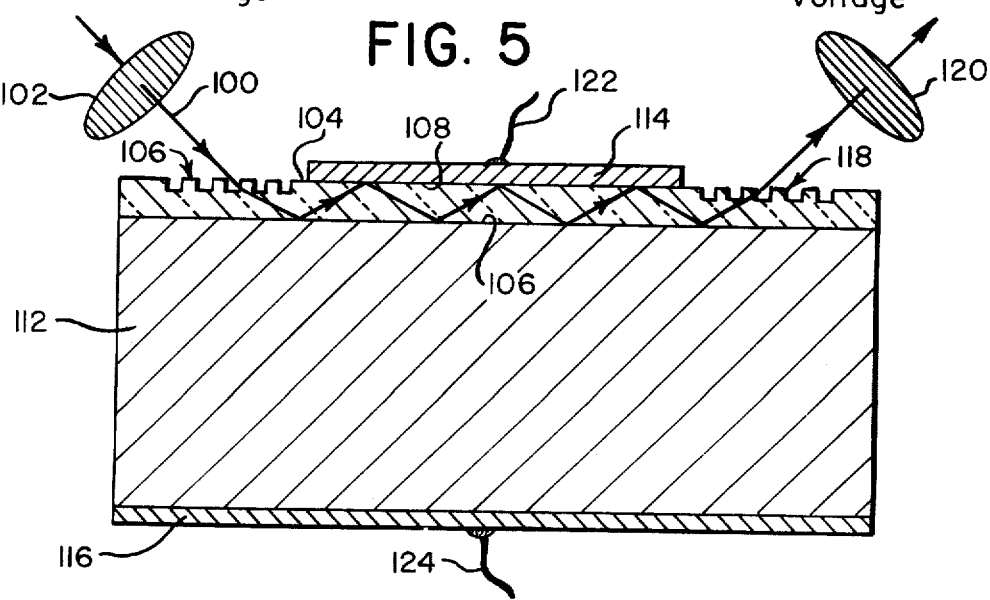
FIG. 5 is a schematic representation of a system for achieving amplitude modulation of light waves having a frequency above the cutoff frequency.

For wavelengths shorter than the cutoff wavelength, substantially no variation in amplitude accompanies variation in phase. If it is desired to amplitude modulate a light beam whose wavelength is shorter than the cutoff wavelength of the wave guide, a polarizer can be introduced at the input of the wave guide and an analyzer introduced at its output. Such an arrangement is shown in FIG. 5. A light beam 100 enters polarizer 102, which polarizes the light as it enters thin film 104 through grating 106. The light beam continues through thin film 104 by multiple internal reflections between the outer surface 108 of thin film 104 and the interface 110 between thin film 104 and substrate 112. Reverse bias voltage applied to electrodes 114 and 116 has the effect of setting up an electric field in thin film 104, which changes the phase of the light as it advances through thin film 104. Thus, the polarization of light exiting through grating coupler 118 may be varied. If polarizing filter 120, which serves an an analyzer, is oriented to pass a maximum of light when no voltage is applied to electrodes 114 and 116 via lead wires 122 and 124, application of a voltage to these electrodes will change the polarization of exiting light and therefore reduce the amount of light that polarizing filter 120 will pass. In this manner, the inventive modulator, which by itself modulates the polarization of a light beam passing through it, may be used to vary the amplitude of that light beam.

While a preferred embodiment of the invention has been described, it is, of course, understood that this embodiment is only illustrative of the invention and that various modifications of the invention will be obvious to one of ordinary skill in the art and that these modifications are within the spirit and scope of the invention as limited only by the appended claims.

I claim:
1. In combination:
   a. a wave guide for phase modulating a light beam comprising:
      i. a substrate of semiconductor material exhibiting a first kind of electrical conductivity;
      ii. a film of a glassy amorphous material exhibiting the other kind of electronic conductivity disposed upon said substrate, a diode junction being formed thereby;
      iii. first conductive means for making ohmic contact with said substrate;
      iv. second conductive means for making ohmic contact with said layer of glassy amorphous material; and
      v. means for coupling light into said film;
   b. modulation voltage means electrically coupled to said first and second conductive means for applying between said first and second conductive means a modulation voltage for biasing said diode junction; and
   c. a source of light optically coupled to said phase modulating wave guide by said coupling means for providing to said film of glassy amorphous material a light beam whose phase is to be modulated.

2. The combination according to claim 1, wherein said diode junction is reverse biased.

3. The combination according to claim 2, wherein said film is substantially coextensive with said second conductive means.

4. The combination according to claim 2, wherein said means for coupling light comprises a phase grating disposed on the surface of said film for optically coupling said source of light into said film.

5. The combination according to claim 4, wherein said phase grating is cut into the surface of said film.

6. The combination according to claim 2, wherein said second conductive means is transparent.

7. The combination according to claim 1, wherein said glassy film is doped to a conductivity of at least 5 Ωcm.

8. The combination according to claim 7, wherein said substrate is doped to a conductivity of at least 100 Ωcm.

9. The combination according to claim 8, wherein said first conductive means is a gold alloy and said second conductive means includes an interfacing layer of chromium between the main portion of said conductive means and the surface of said glassy film.

10. A semiconductor wave guide comprising:
   a. a substrate of semiconductor material exhibiting a first kind of electrical conductivity;
   b. a film of glassy amorphous semiconductor material exhibiting the other kind of electrical conductivity disposed upon said substrate;
   c. first conductive means for making ohmic contact with said substrate;
   d. second conductive means for making ohmic contact with said film of glassy amorphous material; and e. means for coupling light into said film.

11. The combination according to claim 10, wherein said diode junction is reverse biased.

12. The combination according to claim 11, wherein said film is substantially coextensive with said second conductive means.

13. The combination according to claim 11, wherein said means for coupling light is a phase grating disposed on the surface of said film.

14. The combination according to claim 13, wherein said phase grating is cut into the surface of said film.

15. The combination according to claim 11, wherein said second conductive means is transparent.

16. The combination according to claim 11, wherein said glassy film is doped to a conductivity of at least 5 Ωcm.

17. The combination according to claim 11, wherein said substrate is doped to a conductivity of at least 100 Ωcm.

18. The combination according to claim 17, wherein said first conductive means is a gold alloy and said second conductive means includes an interfacing layer of chromium between the main portion of said conductive means and the surface of said glassy film.

19. A method of operating a diode that comprises:
a. a substrate of semiconductor material exhibiting a first kind of electronic conductivity;
b. disposed upon said substrate a layer of a glassy amorphous material exhibiting the other kind of electronic conductivity, a diode junction being formed thereby; and
c. means for coupling light into said layer, Said method comprising the steps of:
d. causing a light beam to enter said layer of glassy amorphous material through said means for coupling light into said layer; and
e. modulating said light beam by applying a modulating voltage to said diode junction.

20. A method as in claim 19, wherein said applied modulating voltage reverse biases said diode junction.

21. A method as in claim 20, wherein said light beam which is caused to enter said layer of glassy amorphous material is of a frequency which is relatively near to the optical cutoff frequency of the diode, thereby effecting amplitude modulation of the light beam.

22. A method as in claim 20, wherein said light beam has a wavelength substantially longer than the wavelength of electromagnetic radiation at the optical cutoff frequency of said diode, thereby effecting phase modulation of said light beam without substantially affecting the amplitude of said light beam.

23. A method as in claim 22, further comprising the steps of:
a. polarizing said light beam prior to its entry into said layer of glassy amorphous material; and
b. analyzing said light beam after its exit from the layer of glassy amorphous material, thereby effecting amplitude modulation of the light beam.

* * * * *

UNITED STATES PATENT OFFICE
CERTIFICATE OF CORRECTION

Patent No. 3,951,513   Dated April 20, 1976

Inventor(s)   James V. Masi

It is certified that error appears in the above-identified patent and that said Letters Patent are hereby corrected as shown below:

Column 6, line 49 (claim 7), "1" should read -- 2 --.

Signed and Sealed this

Fourteenth Day of December 1976

[SEAL]

Attest:

RUTH C. MASON
*Attesting Officer*

C. MARSHALL DANN
*Commissioner of Patents and Trademarks*